April 29, 1969     E. J. TUTHILL     3,440,731
MAGNETICALLY STABILIZED FLUIDIZED BED
Filed Feb. 8, 1966
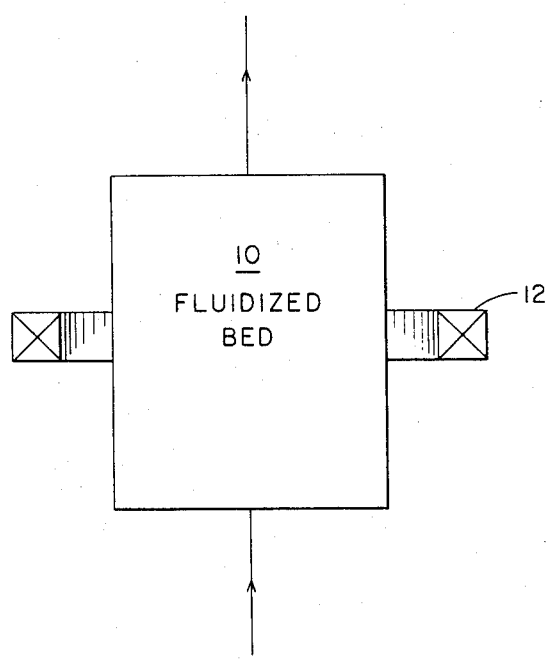
INVENTOR.
EDWIN J. TUTHILL
BY

3,440,731
MAGNETICALLY STABILIZED FLUIDIZED BED

Edwin J. Tuthill, Belle Terre, N.Y., assignor to the United States of America as represented by the United States Atomic Energy Commission
Filed Feb. 8, 1966, Ser. No. 526,327
Int. Cl. B01f 3/06; B01k 1/00; F26b 3/08
U.S. Cl. 34—1     3 Claims

ABSTRACT OF THE DISCLOSURE

A stabilized fluidized bed reactor wherein stabilization is achieved by subjecting a bed having ferromagnetic properties to a magnetic field.

---

The invention described herein was made in the course of, or under a contract with the U.S. Atomic Energy Commission.

This invention is related to a method and apparatus for carrying out processes in fluidized bed type reactors. More particularly it relates to a method and apparatus in which chemical processes and reactions can be carried out in fluidized beds with greater efficiency, a greater throughput of reactants and economy by the application of magnetic forces to magnetizeable particulate matter making up the bed.

The fluidized bed as it is called, results when a fluid, usually a gas, flows upward through a bed of suitably sized, solid particles at a velocity sufficiently high to buoy the particles, to overcome the influence of gravity, and to impart to them an appearance of great turbulence, similar to that of a violently boiling liquid. Fluid velocities must be intermediate between that which would lift the particles to maintain a uniform suspension and that which would sweep the particles out of the container.

During the fluidization of the bed there is excellent contact between the solid particles and the gaseous fluidizing medium; and if there is a temperature difference, there is an excellent flow of heat between the particles and the gas. Thus equilization of temperature is rapidly accomplished. Similarly, there is a major opportunity for mass transfer to or from the solid particles and between the solid particles and the gas phase, as in the movement of reactants in the fluid phase toward the surface of solid particulate catalysts and the reverse movements of the products away from the catalytic surface back to the body of the fluid phase.

Thus with such excellent opportunities for heat and mass transfer to or from solids and fluids, fluidized beds have become a major tool in such fields as drying, roasting and other processes involving chemical decomposition by heat. An important application has been in the catalysts of gas reactions wherein the excellent opportunity of heat transfer and mass transfer between the catalytic surface and the gas stream gives performance unequaled by any other system. Many other chemical processes have utilized the fluid bed system, e.g. the catalytic conversion of naphthalene to phthalic anhydride.

Conventional fluid bed reactors have inherent limits as to the amount of fluid that may be passed through the bed which limits have heretofore limited the use of fluid beds in many catalytic processes. When fluid velocities are too high, the particles are lifted out of the container thus the throughput of the fluid through the bed is limited by the size of the bed and the bed container. If the fluid velocity is too low, the capacity of the bed is limited. To increase the fluid throughput others in the art have resorted to larger and higher bed containers which are high in cost.

Another limiting factor in the use of fluid beds has been attrition of the particles making up the beds. This attrition is a result of the high degree of turbulence found in conventional beds. The attrition is greatly accelerated when slugging is present. As the particles are worn down by the inter-collisions with each other as a result of the turbulence and/or slugging they lose weight and are subject to being carried out of the bed by the fluidizing as fines. Many conventional systems must provide costly recovery systems to recover such attrition produced fines. Further, many catalysts are so pulverulent that the turbulence and/or slugging found in conventional fluid beds prevents their use in fluidized bed processes.

It is an object of this invention to provide those skilled in the art with a highly efficient economical apparatus and method for stabilizing fluid bed processes wherein the conventional slugging effect resulting from too high a fluid velocity through the bed is sharply reduced.

It is another object of this invention to provide those skilled in the art with a method and apparatus for stabilizing the fluid beds wherein the degree of bed expansion is controlled to a high degree by forces other than the velocity of the fluid through the bed.

It is another object of this invention to provide those skilled in the art with a method and apparatus for maintaining equal interstitial distances between the particles of a fluidized bed.

It is a further object of this invention to provide those skilled in the art wtih a method and apparatus to sharply reduce the rate of particulate attrition of the particles in a fluidized bed resulting from the turbulence of the particles in a fluidized bed.

Other objects of this invention will in part be obvious and will in part appear hereinafter.

It has been discovered unexpectedly that fluidized beds made up of fluidizable particulate solids; which solids have ferromagnetic properties, when fluidized by a gaseous fluidizing medium can be readily stabilized by a process in which a magnetic force is applied to the fluidized particulate solids in the amount sufficient to magnetize at least a portion of said particulate solids. The magnetic force should be applied in an amount which is sufficient to provide a magnetic field in at least a portion of the fluidized bed. The strength of the magnetic field that is applied to the fluidized bed in the practice of this invention should be sufficient to prevent slugging without interfering with proper fluidizations of the bed and without causing the bed particles to agglomerate into a lump.

It has further been discovered that a process for producing stabilized fluidized beds can readily be carried in a fluidized bed reactor having a vessel for containing the bed, a bed made up of fluidizable particulate solids, said solids exhibiting at least moderate ferromagnetic properties, a gaseous bed fluidizing medium, means for generating a magnetic field operably connected to said vessel in such a manner that the magnetic field will include at least a portion of said solids when said solids are fluidized.

Brief description of the figure

The figure shows a schematic diagram of an apparatus constructed in accordance with my invention wherein a fluidized bed 10 is surrounded by a magnet 12 with arrows showing lines of flow of the fluidizing medium.

By the term stabilized fluidized bed as used in this application I mean an expanded fluidized bed of particulate solids in which the turbulent motion of the solids and slugging effects produced by the growth of gas bubbles found in conventional fluidized beds can be completely suppressed and that the uniformly expanded particulate solids making up the fluidized stabilized beds of my invention have greatly increased gas throughout capacity with no increase in pressure drop or slugging.

By the term fluidizable particulate solids having ferromagnetic properties for the purposes of defining this invention, I mean particulate solids of a size and shape capable of being fluidized in conventional fluidized beds with the added advantage that very fine particles which ordinarily would be ejected from conventional systems may remain as a part of my magnetically stabilized fluidized bed. For the purpose of this invention define the term ferromagnetism as applied to the particulate solids making up the stabilized beds of my invention as meaning solids exhibiting an ability to become magnetized while under the influence of a or in contact with a magnetic field, i.e., iron, nickel, cobalt, iron oxides, ferrites, ferro-magnetic alloys and other non-magnetic materials coated with and/or containing dispersed therein solids having the quality of ferromagnetism. As is well known to those skilled in the art the ferromagnetic property of particulate solids will of course be subject to variation due to composition, alloying ingredients, surface coatings, geometric configuration, size etc. The degree of ferromagnetism of a particulate material can be readily ascertained by simply contacting the material with a magnet.

This invention is related to the application of a magnetic force to fluidized solids having ferromagnetic properties and is not to be limited to any specific method of producing the magnetic force. Conventional permanent magnets and/or eltctromagnets can be employed to provide the magnetic force used in the practice of this invention. The positioning of the magnets will of course vary with the solids used, degree of fluidization required and the effects desired. In the preferred embodiment of this invention, a toroidally shaped electromagnet is employed to surround at least a portion of the fluidized bed as this provides those skilled in the art with an excellent method of achieving near uniform magnetic force and stability throughout the bed. Such electromagnets when powered by alternating current and coupled with a variable auto-transformer are capable of making fine adjustments in the force of the field impinging on the bed particles and provide an excellent method of stabilizing the fluidization of the bed particles in response to changing flow rates of the fluidizing medium. Similar fine tuning can be had when direct current is used to power the electromagnet with the use of a rheostat.

This invention is not limited by the shape or positioning of the magnet employed to produce the requisite magnetic force. The magnet can be of any size, strength or shape and can be placed above or below the bed to achieve special effect. The magnets employed in this invention can be placed within or without the vessel and may even be employed as an integral portion of the vessel structure itself. Thus another advantage of the use of this invention for stabilizing fluidized bed reactors will be apparent to those skilled in the art, the process is not limited to any particular vessel material and it can be readily adopted for use in reactors currently employed by industry.

The degree of magnetic force to be applied to the fluidized solids in this invention will of course depend on the degree or strength of the ferromagnetic particles to be effected and the amount of stabilization desired. Thus, particulate solids having weak ferromagnetic properties, e.g. cobalt, nickel, etc. will require the application of a stronger magnetic field that particulate solids having strong ferromagnetic properties, e.g., iron, to achieve similar stabilization effects. The size and shape of the solids will also obviously have an effect on the strength of the magnetic field to be employed. However, since the strength of the field produced by an electromagnet can be finely adjusted by adjusting the field strength of the electromagnet, an operator can readily adjust the field strength employed to achieve the desired degree of stabilization for the particular system employed. Magnetic field strength can also be adjusted by changing the distance of the magnet to the bed.

The following example is given solely to illustrate the practice of my invention and it is not to be construed as a limitation thereon.

EXAMPLE

One hundred and ninety-two grams of ⅛ in. diameter carbon steel balls were charged to an open-topped cylindrical glass fluidization column having an inner diameter of 1½-in. and a height of 24 inches. At the lower end of the column the diameter was tapered and fitted with a gas inlet of reduced diameter. Near the bottom of the column and supported by the tapered section were several layers of woven stainless steel mesh having about ⅛-in. openings. The mesh layers were arranged with their grid axes in non-orthogonal alignment to serve as a combination support grid for the balls and as a distribution plate for the fluidizing medium.

The height of the settled bed of balls extended for 2½ in. above the topmost layer of mesh.

A toroidal coil having an inner diameter of 2 in. and a square cross-section of 1¼ in. was supported coaxially with the fluidization column with the mid-plane of the coil at a height of 4½ in. above the topmost layer of mesh. When supplied with a 60 cycle current of 0.8 ampere at 3.5 volts, the measured resistance of the coil was 1.9 ohms. The magnetic field developed by the coil with the above current and voltage is shown in Table I.

TABLE I

| Distance above top of coil (¹⁄₁₆-in.) | Measured field (gauss) |
| --- | --- |
| 1 | 570 |
| 9 | 365 |
| 17 | 225 |
| 25 | 150 |

With no current supplied to the coil, the bed of steel balls was fluidized with compressed air at a pressure of 12 p.s.i.g. as measured by an aneroid pressure gage at the gas inlet to the fluidization column. Fluidization was non-uniform and was characterized by slugging to a height of about 18 to 20 inches above the bed support. With 60-cycle alternating current supplied to the coil at a voltage of about 3.5 volts, fluidization became stabilized and uniform throughout the bed. The flow of compressed air was then increased until a gage reading of 25 p.s.i.g. was reached. At this flow rate the height of the stabilized bed was 5 in. from the topmost layer of mesh to the top of the fluidized bed of steel balls.

Based upon calculations assuming that the volumetric rate of flow of air is proportional to the square root of the pressure drop through the fluid bed and that the gage reading measures pressure drop through the bed, the flow rate of air through the magnetically stabilized bed was 1.4 times greater than through the unstabilized bed.

I claim:
1. A stabilized fluidized bed type reactor comprising:
   (a) a vessel having gas inlet means and gas outlet means;
   (b) a fluidizable bed made up of particulate solids, said solids having ferromagnetic properties;
   (c) magnetic stabilizing means capable of forming a magnetic field in at least a portion of the fluidized bed.
2. A reactor in accordance with claim 1 wherein said magnetic means is an electromagnetic means.

3. A reactor in accordance with claim 2 wherein said electromagnetic means is a toroidally shaped electromagnet surrounding the fluidized solids.

References Cited

UNITED STATES PATENTS

| 2,497,501 | 2/1950 | Himmel et al. | 34—1 |
| 2,602,134 | 7/1952 | Nelson | 34—1 |
| 2,799,640 | 7/1957 | Pevere et al. | |
| 2,880,109 | 3/1959 | Current et al. | |

JOHN J. CAMBY, *Primary Examiner.*

U.S. Cl. X.R.

204—155; 34—10; 148—103; 75—26